United States Patent [19]
Johnson
[11] 4,222,048
[45] Sep. 9, 1980

[54] THREE DIMENSION GRAPHIC GENERATOR FOR DISPLAYS WITH HIDDEN LINES

[75] Inventor: Walter J. Johnson, Seattle, Wash.
[73] Assignee: The Boeing Company, Seattle, Wash.

[21] Appl. No.: 911,765
[22] Filed: Jun. 2, 1978
[51] Int. Cl.[2] .......... G06F 3/14
[52] U.S. Cl. .......... 340/747; 340/723; 340/727; 340/736; 340/722
[58] Field of Search .......... 340/722, 791, 723, 727, 340/729, 732, 736, 747

[56] References Cited

U.S. PATENT DOCUMENTS

| | | | |
|---|---|---|---|
| 3,603,963 | 9/1971 | Ward | 340/747 |
| 3,721,855 | 3/1973 | Comley | 340/747 |
| 3,781,785 | 12/1973 | Balch | 340/732 |
| 3,944,997 | 3/1976 | Swallow | 340/703 |
| 4,016,544 | 4/1977 | Morita et al. | 340/703 |

*Primary Examiner*—Marshall M. Curtis
*Attorney, Agent, or Firm*—Cole, Jensen & Puntigam

[57] ABSTRACT

The graphic generator includes a coding section which produces a series of data words which describe the input data to be displayed in terms of change of slope over time. Each data word contains enough information to describe one line on a display raster. The data is displayed as a three variable image, one variable being in the horizontal dimension of the raster, another variable being in the vertical dimension of the raster, the other variable being the intensity information of the display, which is superimposed on the vertical axis of the display through a summation of the vertical deflection circuit. The lines of the raster may be rotated with the superimposed intensity information being held constant as a reference, so that the view of the image appears to change, thus providing a three dimensional view of the image. On successive raster drawing cycles, as each line is drawn, the data word for that line is compared with the data word for the last previous line, and then further previous lines, on a bit by bit basis. If the data word bit for the line being drawn is the smaller, it is then blanked on the next drawing cycle to solve the hidden line problem.

11 Claims, 7 Drawing Figures

Fig. 1a
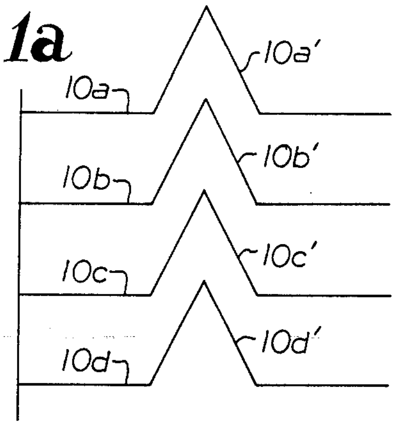
Fig. 1b
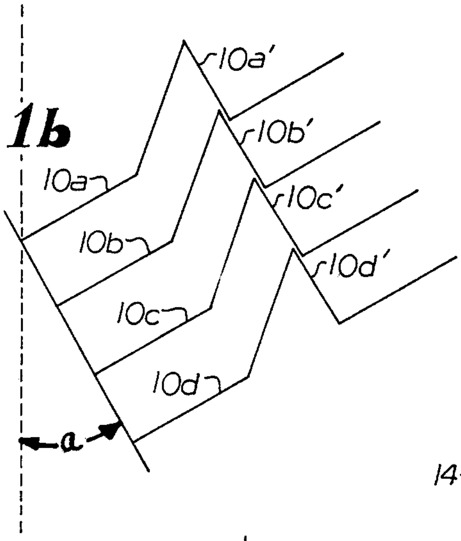
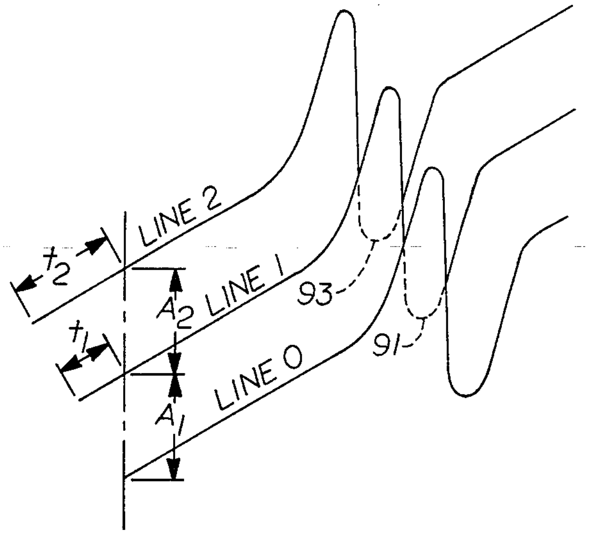
Fig. 6
Fig. 2
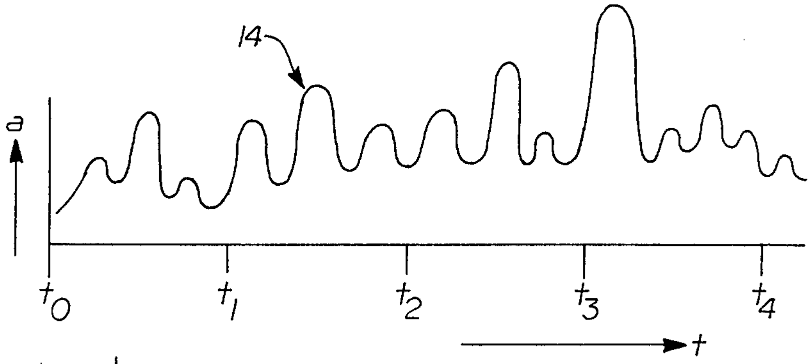
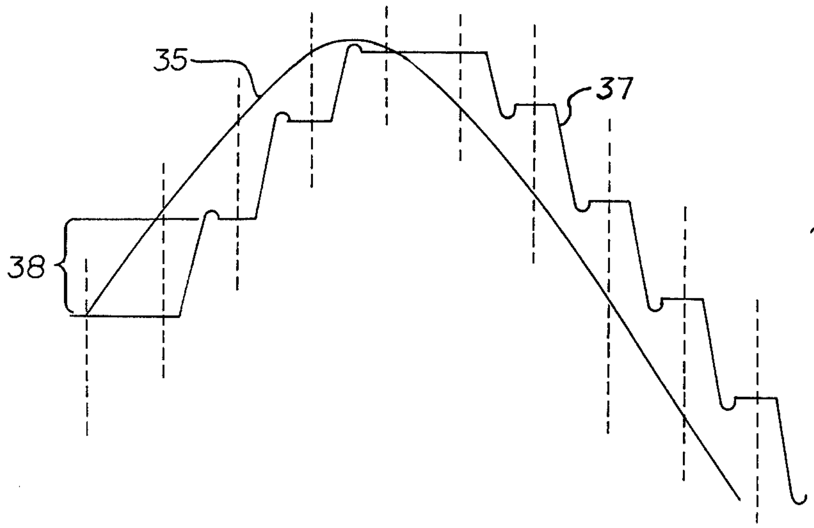
Fig. 4

THREE DIMENSION GRAPHIC GENERATOR FOR DISPLAYS WITH HIDDEN LINES

BACKGROUND OF THE INVENTION

The invention relates generally to the art of graphic generators, and more particularly concerns an improvement in three dimension graphic generators.

In general, the basic concept of a three dimension graphic generator is known. In such graphic generators, as with two dimension graphic generators, information from a sensor, such as a camera, is typically displayed in the form of a raster comprising a vertical succession of horizontal lines. One dimension, or image variable, of the display is along the horizontal axis and referred to as image width, produced by the horizontal length of the raster lines, while a second dimension, or image variable, is along the vertical axis and referred to as image height, produced by the vertical succession of raster lines. A third dimension, or image variable, referred to as the image depth, is the intensity information of the display, which, instead of being a variable in each line of the display, as is the case with a television display for instance, is used as a deflection signal, superimposed on the vertical axis. The intensity of each line in the display thus does not change, although it appears to the viewer to change because of the variation in the deflection of each line in accordance with the intensity information.

FIG. 1*a* is a diagram which shows several lines 10*a*–10*d* of a very simplified raster. Each raster line has the same intensity over its entire length, but varies in vertical position or deflection in accordance with the intensity information of the input data for that line. An intensity variation is shown in each line as portions 10*a'*–10*d'*.

The three dimension feature of such generators is obtained by rotating the raster lines through a selected angle while maintaining the orientation of the intensity information which has been superimposed on the vertical axis undisturbed. The intensity information thus becomes a reference point around which the raster lines are rotated.

The viewpoint of the particular scene being displayed thus appears to change, i.e. the scene appears now to be viewed from a different angle, without a change in the sensor viewpoint or the input data. Such a graphic generator operates in three dimensions, because the display can be manipulated electronically so that the scene appears to be viewed at different angles, without changing the viewpoint of the sensor.

With such an apparatus, the raster lines of FIG. 1*a*, when rotated through an angle a, appear as shown in FIG. 1*b*, in which the lines 10*a*–10*d* are rotated, except for the intensity information portions 10*a'*–10*d'*, which maintain their original orientation. It can be seen from an inspection of FIG. 1*b* that rotation of the raster lines about the intensity information will change the apparent view of the display without changing the viewpoint of the sensor. Hence, the data from the sensor appears to be three-dimensional, as the image appears to have true depth. Such generators are in general known in the art. One such generator is available from International Imaging Systems/I$^2$S of Mountain View, Calif. 94023.

However, existing three dimension graphic generators have two very significant disadvantages where heretofore have limited their usage. First, an 11 bit word has been heretofore used to describe each resolution element or point on the display, which requires a very large amount of memory space. A typical raster that displays a million resolution elements will thus require a memory capacity of eleven million bits. This is accomplished presently by converting the data to analog form, recording it on a drum memory and then utilizing it as a vertical dimension summation on the synchronized raster.

The second disadvantage concerns the so-called hidden line problem inherent in the generation of the image. The hidden line problem concerns those portions of individual raster lines which should not be present in a given image because they are in reality hidden by another part of the image. Hidden lines obscure the true data of the real image and hence, are undesirable. The large amounts of data required to form the three dimension image, as noted above, however, make it impractical to correct the hidden lines in current generators.

In view of the above, it is an object of the present invention to provide a graphic generator which solves one or more of the problems of the prior art discussed above.

It is another object of the present invention to provide such a graphic generator which reduces the size of the memory necessary to generate a three dimension image.

It is a further object of the present invention to provide such a graphic generator which presents a truer image by solving the hidden line problem.

It is an additional object of the present invention to provide such a graphic generator which produces such a truer image in a relatively short period of time.

DESCRIPTION OF THE DRAWINGS

A more thorough understanding of the invention may be obtained by a study of the following detailed description taken in conjunction with the accompanying drawings in which:

FIGS. 1*a* and 1*b* are diagrams representing several raster lines of a simple display for rotated and non-rotated positions, respectively.

FIG. 2 is a section of a continuous input data signal, plotting intensity vs. time.

FIG. 4 is a signal waveform showing the manner in which input data is converted into data words.

FIG. 6 is a signal diagram showing several raster lines of a simplified display, arranged to illustrate the hidden line problem.

SUMMARY OF THE INVENTION

Figure 3:
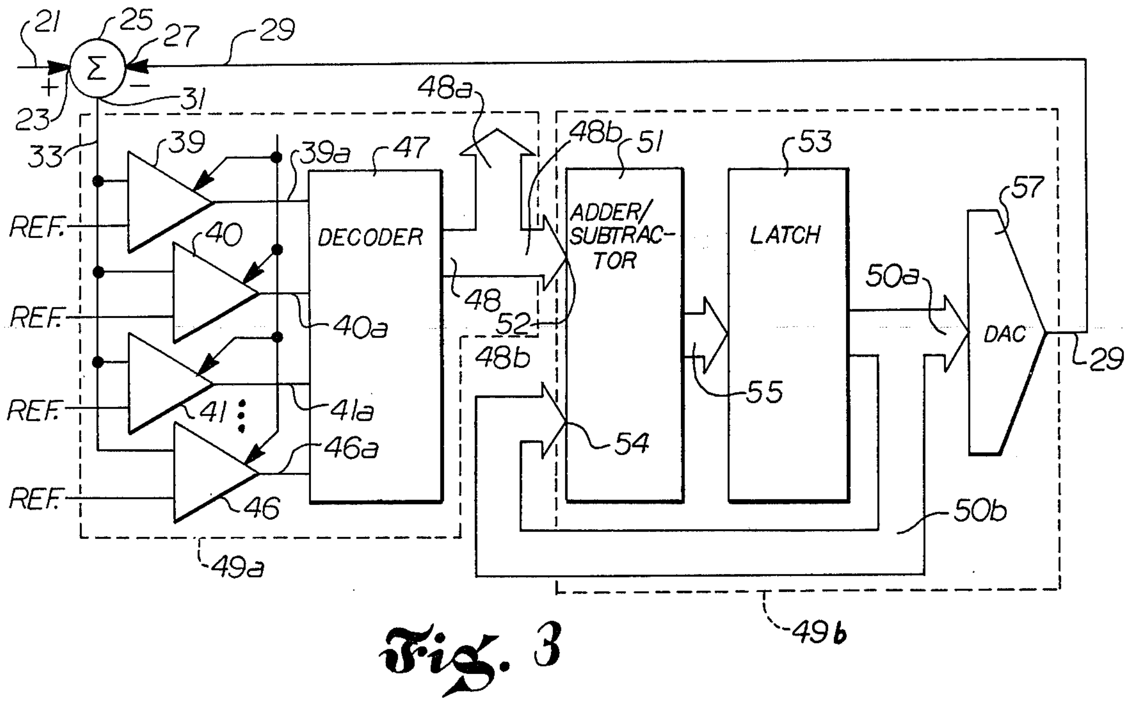
FIG. 3 is a block diagram showing the apparatus for converting the continuous input data of FIG. 2 into corresponding data words.

Accordingly, a graphic generator is provided which displays a continuous input data signal as a raster of lines which is drawn repeatedly in cycles to form a three-variable image. The first image variable is the side-to-side dimension of the raster lines. The second image variable is the top-to-bottom dimension of the vertical succession of raster lines. The third image variable is the intensity information in the image, which is presented in the form of a corresponding vertical deflection of the raster lines. The generator includes means for defining the continuous input data signal in the form of data code words, each of which is representative of a selected portion of the input data and comprises a number of characters and further includes means storing those data code words. Also included is means for retrieving from the storing means first and second data words which represent, respectively, input data which is to be displayed at the same relative position in two different raster lines, a selected one of which is termed a comparison reference line, and typically is the line which is being drawn by the graphic generator. Means are then provided to compare the first and second data words, character by character, and further, means are included to blank that portion of the raster line corresponding to the lesser of the compared pair of characters from said two data words on a future drawing cycle of the raster, if the lesser of the compared pair of characters is from the data word which represents a portion of the raster line which is referred to as the comparison reference line.

DESCRIPTION OF PREFERRED EMBODIMENT

The graphic generator of the present invention produces an image from sensor-developed data in the form of a raster. As in conventional three-dimension graphic generators, the three variable image presented by the graphic generator of the present invention comprises a set of raster lines, wherein one image variable is the left-to-right dimension or length of the lines, i.e. image width, the second image variable is the top-to-bottom dimension of the display, or the number of lines in the display, i.e. image height and raster, the third image variable is the intensity variation in the display, which provides the image with a sense of depth.

The intensity information from the input data, however, does not appear as a variable in each line, but rather is superimposed on the vertical axis by summing it with the vertical deflection signal at the vertical deflection circuit of the display apparatus. When the image is rotated by rotating the raster lines, such as shown in FIG. 1*b*, the intensity information is maintained constant, resulting in an image which appears as though the scene is being viewed from a different angle, even though the sensor has not changed its position. Hence, it appears to the viewer that the display image actually has depth information, since the scene may be apparently viewed from different positions.

The information which is used to produce the image on the display may be from a sensor, such as a camera, or it may in certain applications be computer generated information. The source of the input information is not considered to be a limiting factor on the present invention, however, although the input data presented to the apparatus for display should preferably be continuous. Hence, the input data utilized by the present invention will generally be analog information or continuous digital information.

A typical input data signal might vary widely in intensity, similar to the signal shown generally at 14 in FIG. 2. This input data signal is divided into successive time intervals, i.e. T0 to T1, T1 to T2 and so forth, where the data in each interval is the amount of data to be displayed on one line of the raster. Successive raster lines will display the information contained in successive time intervals of the input data signal.

The input data signal will vary in intensity amplitude against time, as shown in FIG. 2, with the variation in amplitude being the data source for the third image variable of the display.

In previous three-dimension generators, the incoming data signal is converted into a set of raster lines varying in vertical deflection in accordance with amplitude variation of the input data signal. Each line, however, is drawn by successively locating and connecting a plurality of discrete resolution elements, which are each described by an 11 bit word stored in memory.

The present invention uses a different approach to controlling the drawing of each line.. Referring to FIG. 3, apparatus is shown which produces a plurality of data words which represent the input data signal in terms of slope. Each portion of the input signal corresponding to one raster line is defined by what is referred to herein as a data word. The data word comprises a series of data characters, wherein each data character represents the slope of the input signal over a specified time interval which is a small part of each one portion of the input signal.

During each time interval, the slope of the input signal is determined and a four bit character corresponding to that slope is produced. The data characters are then combined into a series of data words, each one of which describes a single raster line, and the individual data words are then stored in a memory for later retrieval and use.

Referring specifically to FIG. 3, the continuous data input signal, such as from a sensor, is presented on input line 21, which is connected to one port 23 of a conventional summing circuit 25. Applied to the other port 27 of summing circuit 25 on line 29 is the output of the circuit of FIG. 3. In the circuit of FIG. 3, the representative data words are produced by a first portion 49*a* of the circuit, and then converted back to an analog signal by a second portion 49*b* of the input, so that in a static situation, the output signal on line 29, will closely resemble, if not be identical to, the input signal on line 21. In a dynamic situation, the output signal will attempt to track the input signal.

Any difference between the signals at ports 23 and 27 of summing circuit 25, which will be the case if the input signal has increased or decreased since the last previous time interval, is produced at port 31 of the summing circuit. Referring to FIG. 4, for instance, at the far left-hand side of the diagram, time T0 indicates a start time for the apparatus for purposes of illustration. From this reference time point, the input signal increases over the first interval T0–T1, until there is a difference 38 between the input signal and the output signal at the end of the first time interval T1. The signal difference 38 on line 33 at time T1 will then be applied as one input to a plurality of reference comparators 39–46, each of which has a particular reference voltage.

In the circuit of the present invention, there are eight comparators, each with its own reference voltage, although fewer or more comparators could easily be utilized. In operation, the outputs of comparators 39–46 will be low, except for the comparator which has a reference voltage closest in value to the signal on line 33, the output of which is high.

All of the output lines 39*a*–46*a* from comparators 39–46 are applied to a decoder circuit 47, which is a conventional device comprising an arrangement of logic gates designed to provide a digital output signal, the value of which varies in accordance with the pattern of signals present/absent on its multiple input lines. The output of decoder 47 on line 48 is a series of binary characters which is representative of the immediate voltage difference between the input data signal on line 21 and the signal on line 29 at successive time intervals.

The immediate output from decoder 47 on line 48 thus describes the increase or decrease in voltage during the previous time increment, and the accumulated total, i.e. the total of all the characters from decoder 47 to that point, is the coded equivalent of the input signal. The successive characters from decoder 47 are grouped and stored as data words, each of which represents one line of input data.

Still referring to FIG. 3, the digital output from decoder 47 is applied on line **48*a* to memory and on line 48*b* to one input 52 of a combination adder/subtractor 51 and a latch circuit 53, which, together with digital-to-analog converter (DAC)57, form portion 49*b* of the circuit. The combination of adder/subtractor 57 and latch circuit 53 reconverts the data words from decoder 47 back into a continuous digital signal. The series of characters on line 48*b* will each have a sign, either plus or minus, depending upon whether the input signal at port 23 is greater or less than the signal at port 27. Each character is applied to adder/subtractor 51, which adds (or subtracts, depending on the sign) the value of that character to the previous total value for the data word being processed. The previous total value is provided over line 50*b* from latch circuit 53 to input 54 of the adder/subtractor. The resulting new total value from adder/subtractor 51 is then applied over line 55 to latch circuit 53**.

The output of latch circuit 53 is also applied over line **50*a* to a conventional digital/analog converter (DAC) 57 which produces an analog signal on line 29 corresponding to the digital input from the latch circuit. The signal on line 29 is a facsimile of the input data signal, and a representative facsimile as shown at 37 in FIG. 4 for an input data signal 35**.

With such a circuit, the data words provided on line 48 by portion **49*a*** should be fairly representative of the input data signal. These data words are thus a companded code which describe or represent the input signal in a compact form. These data words form the data base from which the actual image on the display is drawn, and are stored in a memory. Converting the input data into such a succession of coded data words decreases the size of the memory required by at least two orders of magnitude, i.e. from 11 million bits to approximately 100 thousand bits.

Figure 5:
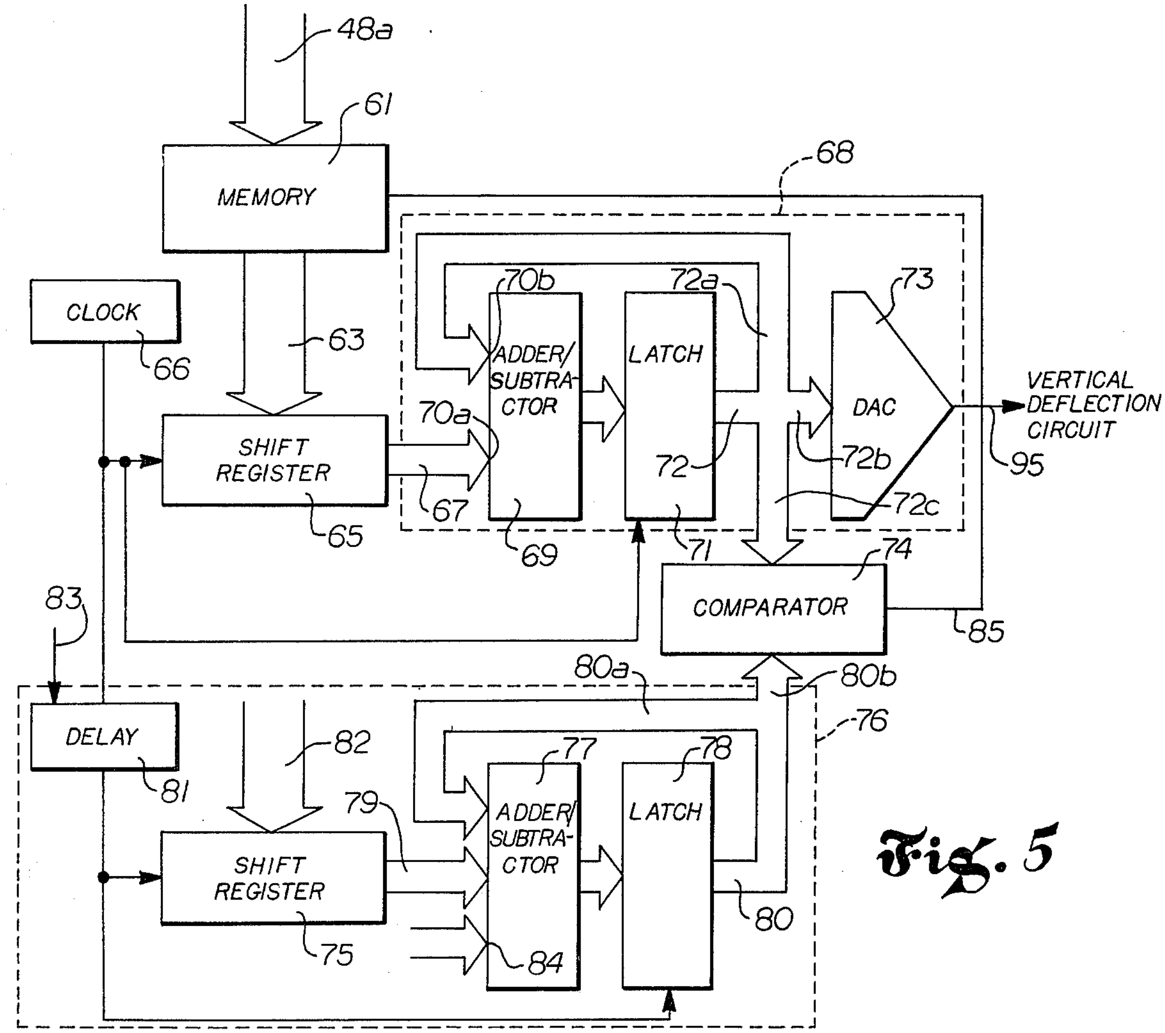
FIG. 5 is a block diagram showing the circuit for producing a three dimension image on a display from the data words produced by the apparatus of FIG. 3.

FIG. 5 shows the circuit portion of the present invention which produces the deflection signals necessary to produce the three dimension image on the display. As mentioned above, in three dimension generators, the raster lines do not vary in intensity. The circuits for drawing the raster lines are conventional and are not shown in FIG. 5. The signal output from the circuit of FIG. 5 is applied to the vertical deflection circuitry of the display apparatus, such as a conventional cathode ray tube, and the resulting variation in the deflection of each raster line, over the whole display, creates the image seen by the viewer.

In operation of the circuit of FIG. 5, the data words in memory 61, which comprise the information necessary to draw one raster line, are successively retrieved and applied on line 63 to a shift register 65. Shift register 65 is pulsed by a clock 66 so that the succession of the characters comprising the data word in the register are applied as an input to circuit 68, which is substantially identical in construction and operation to circuit portion **49*b* of FIG. 3, which produced an analog facsimile signal from a data word input. Reference is made to the description of the operation of portion 49*b* of the circuit of FIG. 3 for explanation of the detailed operation of circuit 68**.

Generally, the character input on line 67 is applied to one input **70*a* of an adder/subtractor 69, the output of which is applied to a latch circuit 71. The output of latch circuit 71 on line 72 is applied on line 72*a* as the other input 70*b* to adder/subtractor 69, and on line 72*b* to a DAC 73. The output of DAC 73** is applied to the vertical deflection circuit (not shown) of the display device, for drawing of the line.

Thus, the intensity information present in the input signal is used for vertical deflection in the display, and the intensity information can thus be said to be superimposed on the vertical axis, forming the image seen by the viewer. The output of latch circuit 71 is also applied on line **72*c* to a digital comparator 74**, for reasons which are explained in more detail hereinafter.

The circuitry explained above is sufficient to draw a raster from stored data words. Additional circuitry, shown in the lower part of FIG. 5 as circuit 76, is necessary, however, to solve the hidden line problem of such three dimension generators. During the first refresh cycle, which refers to the time required to draw the display raster, each data word in memory 61 for the raster is retrieved in turn. The time for each refresh cycle is approximately 50 microseconds, and the raster is refreshed 60 times per second. These values are representative only, however, and are not critical.

During the first refresh cycle, as each data word to be drawn is retrieved from memory 61 and placed in register 65, the last previous data word processed, i.e. the data word representing the raster line just drawn, is placed in shaft register 75 from memory 61 over line 82. Successive data words are then present in shift registers 65 and 75. Before processing of the data begins, two offsets to the data are made. First, the nominal vertical distance on the display between the two raster lines represented by the two data words in shift registers 65 and 75 is entered in adder/subtractor 77 over line 84. This value is known for any two raster lines and may be previously stored in memory 61. Second, the amount of time delay (if any) between the start of the drawing of the two raster lines represented by the two data words, which delay is due to the rotation of the raster (if any), is applied to a time delay 81 on line 83.

These offsets are illustrated in FIG. 6. The designations A1, A2 illustrate the distance offsets entered at input 84 to adder/subtractor 77 when lines 0 and 1, and lines 1 and 2 are being compared, respectively. The designations t1 and t2 illustrate the time offsets entered in time delay 81 for the same comparisons.

The effect of the delay 81 is to delay the application of clock pulses from clock 66 to shift register 75, and hence delaying the processing of the data word in register 75 until the point on the line being drawn is reached which is in vertical alignment with the starting point of the line represented by the word in register 75.

Referring still to FIG. 5, after the offsets have been set, the processing of the data words in shift registers 65 and 75 begins, on a character by character basis. Shift register 75, adder/subtractor 77, and latch circuit 78 operate identically to circuit 68.

The output of latch circuit 71, providing a digital signal from the data word in register 65, and the output of latch circuit 78, providing a digital signal from the data word in register 75, are applied to comparator 74 on a character by character basis. As long as the character from shift register 65 (on line 72*c*), which represents the raster line being drawn, referred to as the comparison reference line, is larger than the character from shift register 75 (on line 80*b*), which represents the last previous raster line or other line being compared, there is no output from comparator 74, and the portion of the raster line corresponding to the character from latch 71 may be drawn.

However, if the character on line 72*c* is smaller than the character on line 80*b*, the comparator 74 produces a one bit output on line 85, which is applied to memory 61 with the character on line 72*c*. This one bit output controls the off/on intensity of the beam for that portion of the line represented by the character on the next refresh cycle. In operation, the beam is on if the bit is not present, and the beam is off if the bit is present.

The comparison of the characters comprising the data words in registers 65 and 75 occurs on the fly during the processing of each successive line in the raster. Hence, at the conclusion of the first refresh cycle, each line has been compared with the last previous line, and any drawing adjustments to the lines from that first level of comparison have been made in memory. For instance, referring to FIG. 6, line 1 would have been compared to line 0 and line 2 would have been compared with line 1, resulting in portions 91 of line 1 and 93 of line 2 being blanked on the next refresh cycle.

On the next refresh cycle, the data words for each line to be drawn, i.e. the comparison reference line, are compared with the words from the next-to-last previous line, and so on until each line is compared individually with every other line, in order to ascertain whether any one line hides any other line in the raster. Because a large number of refresh cycles are completed each second, the entire comparison process can be completed in such a short time that it is barely visible to the viewer. Hence, the hidden line problem is corrected virtually in real time, without any disturbance to the image produced.

The output of the latch circuit 71 is also applied on line 72*b* to DAC 73 which produces the output facsimile of the input signal from the data word in register 65, as illustrated in FIG. 4. The output of DAC 73 is applied on line 95 to the vertical deflection circuit of the apparatus, which deflects the beam accordingly to produce an image.

Hence, a three dimension graphic generator has been described which has all of the advantages of a conventional three dimension graphic generator but which has a substantially smaller memory than is usually necessary in such generators, and which includes circuitry necessary to solve the hidden line problem, in virtual real time.

Although an exemplary embodiment of the invention has been disclosed herein for purposes of illustration, it should be understood that various changes, modifications and substitutions may be incorporated in such embodiment without departing from the spirit of the invention, which is defined by the claims which follow.

What is claimed is:

1. A graphic generator for display of a continuous input data signal as a raster of lines which is drawn repeatedly in cycles and forms a three-variable image, wherein a first image variable is the side-to-side dimension of the raster lines, the second image variable is the top-to-bottom dimension of the vertical succession of raster lines, and the third image variable is the intensity information in the image, which is presented in the form of a corresponding vertical deflection of the raster lines, wherein the graphic generator comprises:

means defining the continuous input data signal in the form of data code words, each of which is representative of a selected portion of the input data and comprises a number of characters;

means storing said data code words;

means for retrieving from said storing means first and second data code words representing, respectively, input data which is to be displayed at the same relative position in two different raster lines, a selected one of which two different raster lines is a comparison reference line;

means comparing said first and second data code words, character by character; and means blanking that portion of the raster line corresponding to the lesser of the compared pair of characters from said two data code words on a future drawing cycle of the raster, if the lesser of the compared pair of characters is from the data code word which represents a portion of the raster line which is a comparison reference line.

2. An apparatus of claim 1, including means adding to one of said first and second data code words an amount representative of the vertical distance on the display between the first and second raster lines.

3. An apparatus of claim 2, including means for rotating the raster of lines through an angle while maintaining the intensity deflection of each line in its original orientation, and further including means for delaying the application of one of said data code words to the comparing means so that the characters in the two data code words being compared represent data to be displayed in portions of said two raster lines which are in vertical registry.

4. An apparatus of claim 1, wherein said defining means includes means defining the slope of said input data signal at successive intervals of time which are substantially smaller than the time for one of said portions of the input data wherein each data character represents the slope of a portion of the input data signal for one interval of time.

5. An apparatus of claim 4, wherein said defining means includes means producing data code words from a signal input, means for converting the data code words back to a corresponding analog signal, means for summing said corresponding analog signal and said input signal to obtain any difference therebetween, and means applying said difference as said signal input to said data code word producing means.

6. An apparatus of claim 3, wherein said data code word producing means includes means for comparing said difference from said summing means against a plurality of reference voltages, and further includes means producing a digital signal which is representative of the one reference voltage closest to the difference, wherein said digital signal is a data character which forms one part of a data code word.

7. An apparatus of claim 3, wherein said characters comprising said data code words represent both positive and negative slope values and wherein said comparing means includes means for temporarily storing said first and second data code words, and for accumulating a total value comprised of successive values of said characters, said accumulated total value being representative of the input data, and means comparing the total values for said first and second data code words.

8. An apparatus of claim 7, wherein said accumulating means includes a series connection of an adder/subtractor circuit and a latch circuit for each data code word being compared, wherein in operation, the corresponding characters from said first and second data code words are applied successively to one input of their associated adder/subtractor circuit, and added therein to the accumulated total of all previous data characters for the data code word of which they are a part to produce a new accumulated total, wherein said latch circuit temporarily stores said accumulated total, and wherein said accumulating means includes means applying said accumulated total in said latch circuit to another input of said adder/subtractor circuit, and means applying said new accumulated total to said latch circuit to update the existing accumulated total stored therein.

9. An apparatus of claim 8, wherein said accumulating means includes clock means for pulsing said first and second data code words from said temporary storing means, and wherein said delaying means includes means for delaying the application of the clock pulses to one temporary storing means.

10. An apparatus of claim 7, wherein said comparing means includes means for adding a data bit to those data characters which are at the point in the particular data code word representing the raster line to be drawn where the accumulated total of the particular data code word is the accumulated total of the data code word representing the other line, and wherein said blanking means includes means responsive to the presence of said data bit to blank out, on the next drawing cycle of the raster, that portion of the raster line being drawn corresponding to the data characters associated therewith.

11. An apparatus of claim 10, including means for storing said data bit with its associated data character.

* * * * *